April 15, 1958  J. J. SPICER, JR  2,831,080
VEHICLE TURN SIGNAL EQUIPMENT
Filed May 8, 1956  5 Sheets-Sheet 1
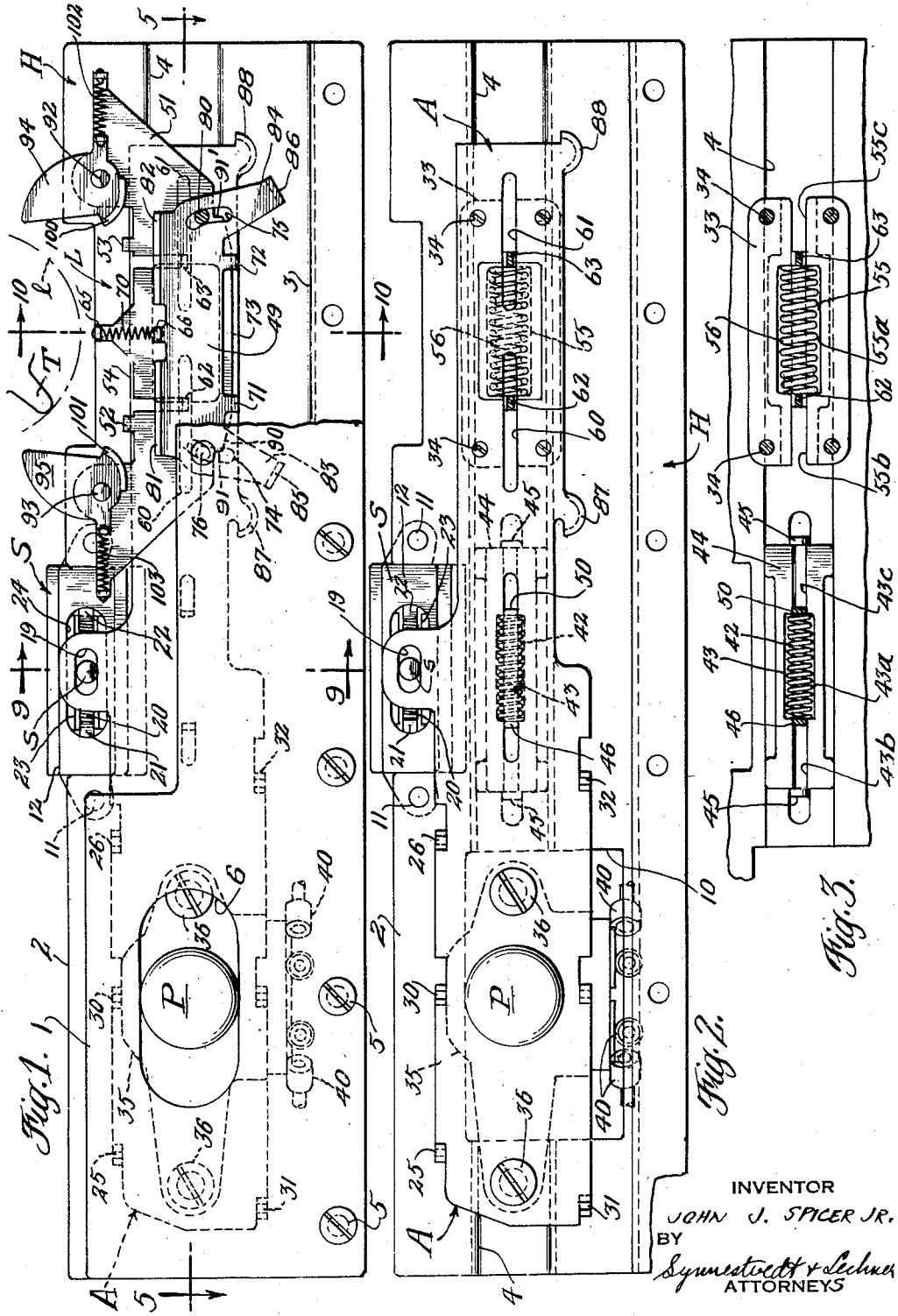
INVENTOR
JOHN J. SPICER JR.
BY
Synnestvedt & Lechner
ATTORNEYS April 15, 1958　　　J. J. SPICER, JR　　　2,831,080
VEHICLE TURN SIGNAL EQUIPMENT
Filed May 8, 1956　　　　　　　　　5 Sheets-Sheet 2
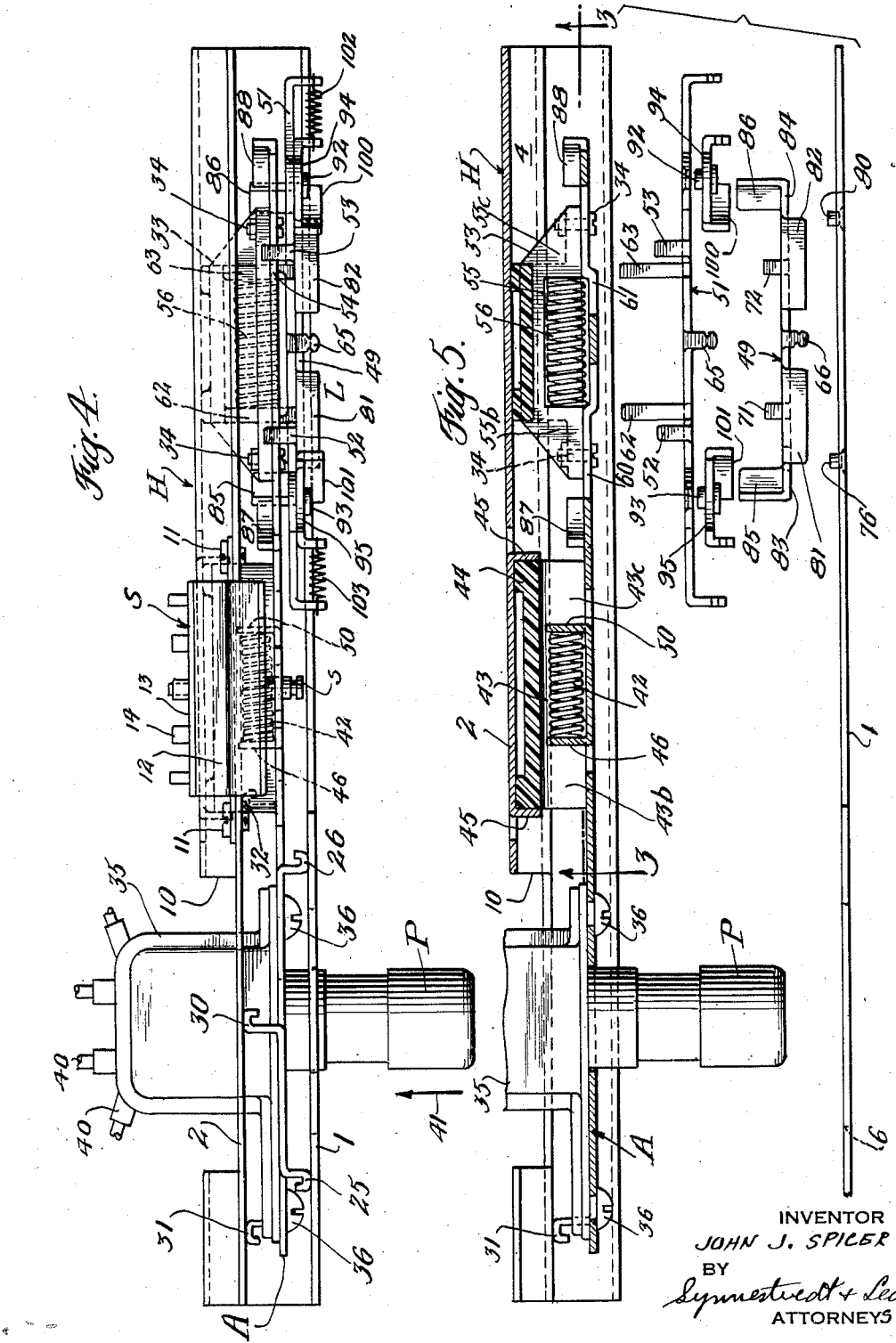
INVENTOR
JOHN J. SPICER JR.
BY
Synnestvedt + Lechner
ATTORNEYS April 15, 1958   J. J. SPICER, JR   2,831,080
VEHICLE TURN SIGNAL EQUIPMENT
Filed May 8, 1956   5 Sheets-Sheet 3
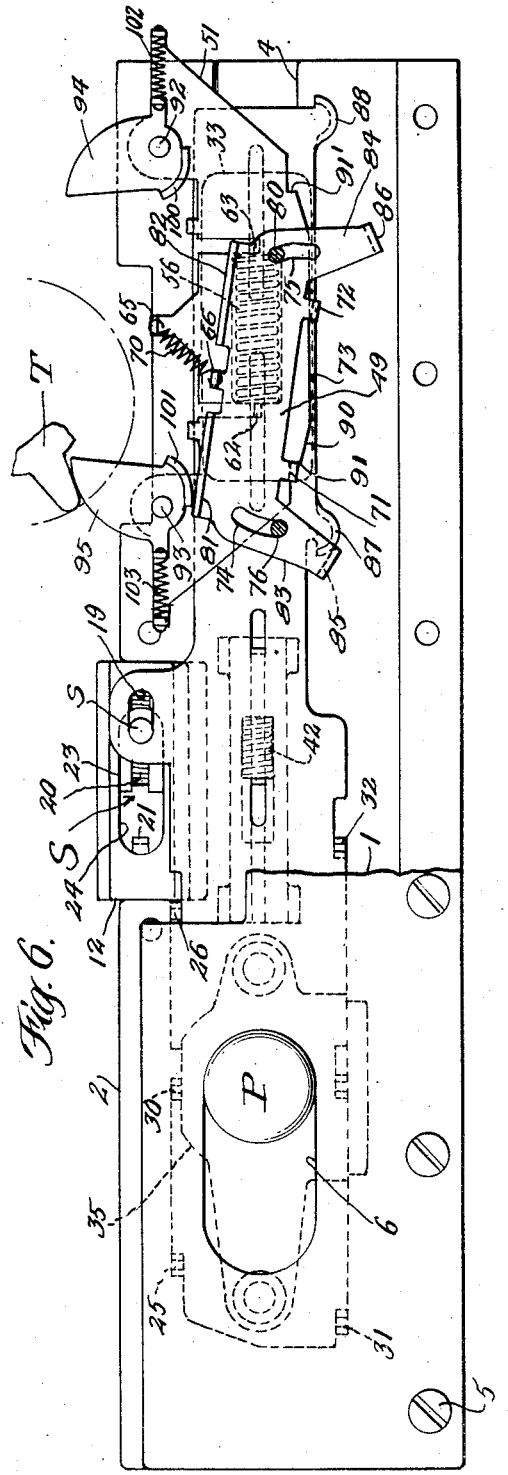
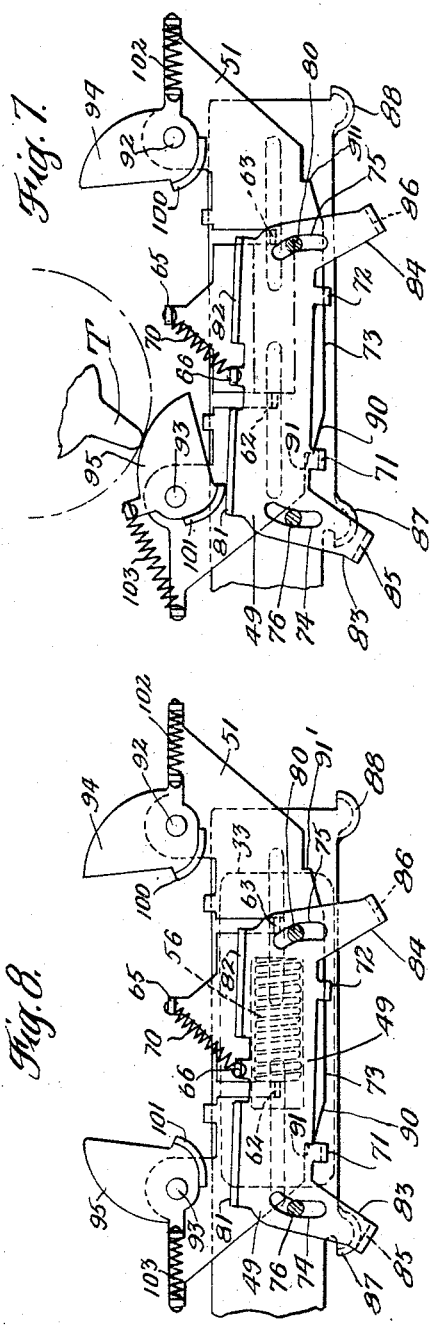
INVENTOR
JOHN J. SPICER JR.
BY
Synnestvedt & Lechner
ATTORNEYS April 15, 1958  J. J. SPICER, JR  2,831,080
VEHICLE TURN SIGNAL EQUIPMENT
Filed May 8, 1956  5 Sheets-Sheet 4
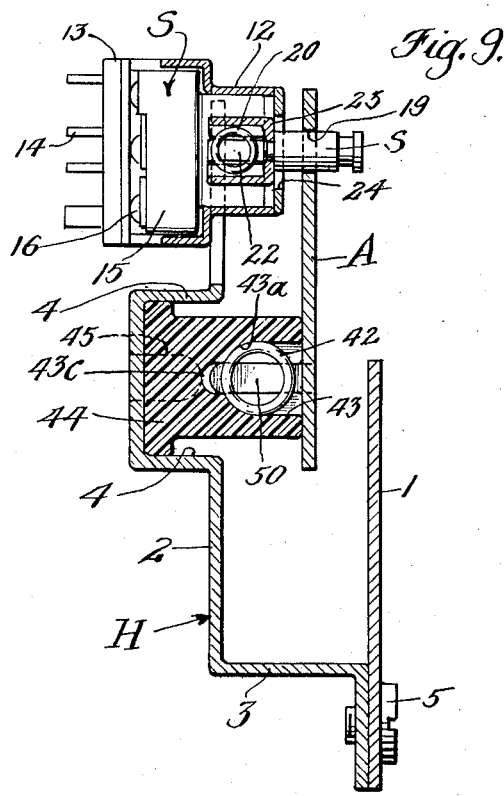
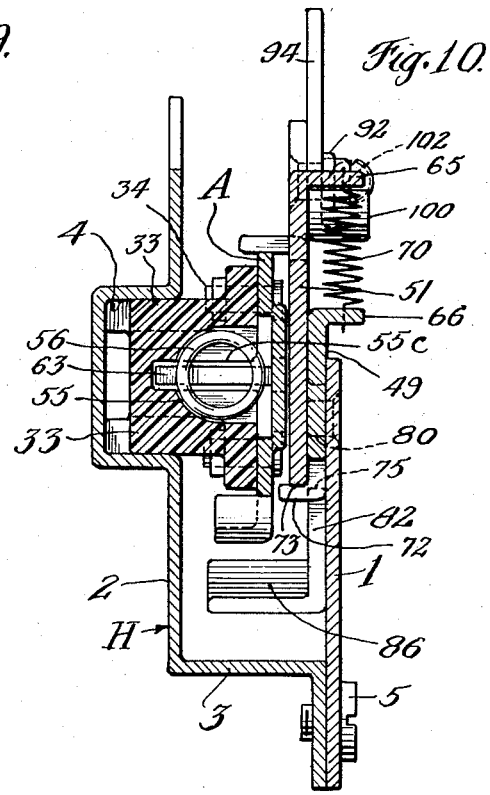
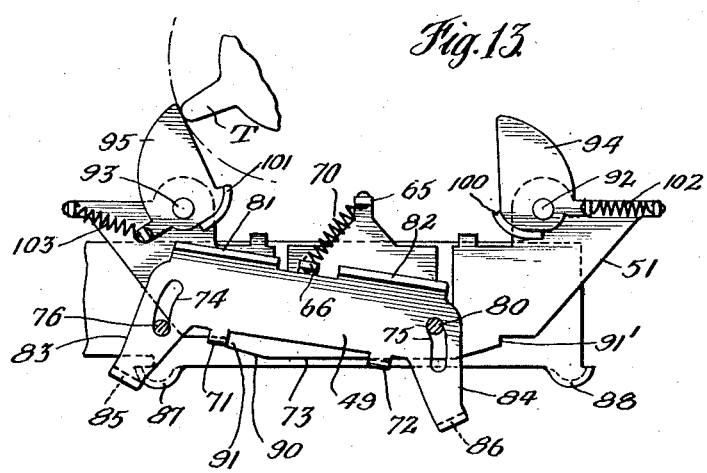
INVENTOR
JOHN J. SPICER JR.
BY
*Synnestvedt & Lechner*
ATTORNEYS

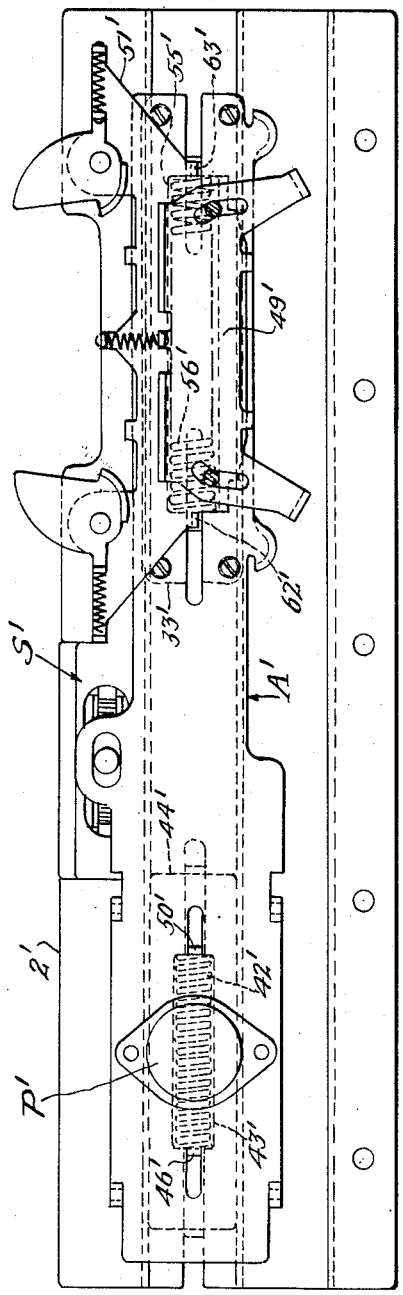

United States Patent Office 2,831,080
Patented Apr. 15, 1958

2,831,080

VEHICLE TURN SIGNAL EQUIPMENT

John J. Spicer, Jr., Philadelphia, Pa., assignor to United Specialties Company, Philadelphia, Pa., a corporation of Delaware Application May 8, 1956, Serial No. 583,401

14 Claims. (Cl. 200—61.29)

This invention relates to turn signal equipment for automotive vehicles and, in particular, relates to a device for use in such equipment which is mounted on the floorboard of a vehicle for actuation by the vehicle operator.

One of the objects of the invention is to provide a floorboard-mounted device for use in the turn signal equipment of a vehicle which is effective to maintain the turn signals in operative condition during the turn and then automatically cancel the same when the turn is completed.

Another object of the invention is to provide a floorboard-mounted device for use in the turn signal equipment of a vehicle which is effective to maintain the turn signals in operative condition during a turn and thence to be automatically actuated to cancel the same or alternatively, to be manually actuated by the operator to cause cancellation.

Another object of the invention is to provide a floorboard-mounted turn signal device which includes a turn signal initiating switch which is controlled by an operating arm adapted to be moved by the foot of the vehicle operator to either of two settable positions for effecting turn indication and locked in the settable position until automatically released at the completion of the turn.

Another object of the invention is to provide a floorboard-mounted turn signal device which includes a turn signal initiating switch which is controlled by an arm adapted to be moved by the foot of the vehicle operator to either of two settable positions for effecting turn indication and locked in the settable position until automatically released at the completion of the turn or until manually released by the action of the operator.

Another object of the invention is to provide a floorboard-mounted device for use in the turn signal equipment of a vehicle which has a portion to be actuated by the foot of the operator for effecting the signal indication and a portion to be associated with the steering post of the vehicle providing for the automatic cancellation of the signal when the turn is completed.

Another object of the invention is to provide a floorboard-mounted self-cancelling turn signal device for use in connection with a dimmer switch assembly, the dimmer having a post which is depressable by the foot of the operator to energize the dimmer circuits and also movable left and right to effect operation of the device.

How the foregoing objects of the invention are accomplished, together with other objects, features and advantages, will be apparent from the following description and drawings wherein:

Figure 1 is a front elevational view with certain portions broken away and illustrating one embodiment of the invention with various of the components in the neutral position;

Figure 2 is a view similar to Figure 1 with certain components removed;

Figure 3 is a fragmentary view taken along the lines 3—3 of Figure 5;

Figure 4 is a plan view of the device of Figure 1;

Figure 5 is an exploded view taken along the lines 5—5 of Figure 1;

Figure 6 is a front elevational view with the front plate broken away showing various of the components when the device is in a settable position for initiating a right-hand turn signal and illustrating the manner in which the components are locked in the settable position;

Figure 7 is a fragmentary view of certain of the components of the right-hand side of Figure 6 and illustrating the manner in which the device is automatically or self-cancelled;

Figure 8 is a fragmentary view of certain of the components of the right-hand side of Figure 6 and illustrating the manner in which the device is manually cancelled;

Figure 9 is an enlarged fragmentary view partially in section taken along the lines 9—9 of Figure 1;

Figure 10 is an enlarged fragmentary view partially in section taken along the lines 10—10 of Figure 1;

Figure 11 is a front elevational view illustrating a modification of the invention;

Figure 12 is an exploded plan view of the device of Figure 11; and

Figure 13 is a fragmentary view illustrating certain of the components of the right-hand side of Figure 6 and how the self-cancelling mechanism is inoperative during a turn.

The embodiment shown in Figure 1 has an elongated housing or mounting bracket H by means of which the device is adapted to be mounted on the floorboard of a vehicle; a turn signal switch mechanism S mounted centrally of the housing; locking and cancelling mechanism L mounted on the right-hand end of the housing; an operating arm A movably mounted within the bracket and interconnected with the switch S and mechanism L; and a post P connected at the left-hand side of the housing to the arm A. Preferably the device is mounted underneath the vehicle floorboard with the mechanism L in close association with the steering post and the housing H extending transversely of the vehicle. The post P is adapted to extend up through the floorboard so as to be contactable preferably by the left foot of the vehicle operator.

The switch S is of the type having a neutral position and two settable positions on the right and left-hand sides of neutral. In the right-hand settable position, the switch functions to interconnect various of the circuits in the turn signal system of the vehicle so that the signal lights on the right-hand side flash to indicate a right-hand turn. In the left-hand settable position, the switch functions to cause the vehicle lights on the left-hand side to flash to indicate a left-hand turn. In the neutral position, the switch functions so that neither the lights on the left or right-hand side of the vehicle will flash. In the embodiment shown, the operation of the switch is controlled by a stud $s$ which is shown in the neutral position and is movable to the left or right to the corresponding settable positions.

The post P and the arm A have neutral and two settable positions corresponding to the neutral and settable positions mentioned above. The stud $s$ of the switch is moved to either of the settable positions by the operator's foot contacting the post P and moving the same either to the left or right. During a turn the switch is held in a settable position by the action of the mechanism L. Thus, the operator need not hold the post in position and can move his foot away if so desired. After the turn is completed, the turn signals are extinguished or cancelled by the switch being automatically unlocked from the settable position and automatically returned to neutral. The unlocking is done by the mechanism L and spring means effects both the return of the switch and arm A and post P to neutral. Furthermore, it is pointed out that cancellation may be effected manually as well as automatically.

As seen in Figure 1, the mounting bracket H comprises a front plate 1 and a back plate 2 which, it will be observed with reference to Figures 9 and 10, has an L-shaped bottom portion 3 abutting the front plate and held thereto by a plurality of screws 5. The portion 3 spaces the front and back plates apart from one another. The front plate is formed with an elongated slot 6 through which extends the post P, the slot accommodating movement of the post from left to right. With reference to Figures 2, 9 and 10, the back plate is formed with a channel 4 which extends throughout the length of the plate and, as best seen in Figures 2 and 4, part of the back plate is cut away so as to provide an opening 10.

The switch mechanism S is mounted centrally of the back plate, being secured thereto by the screws 11. There are many types of switch mechanisms available that can be satisfactorily employed herein, provided the switch functions as described above. A switch which is ideally suited for the purposes herein is shown in my application, Serial No. 352,481, filed May 1, 1953, and now abandoned.

A general description of the structure and operation of the switch follows: the complete details may be had by reference to said application. In general, as best seen in Figures 1 and 9, the switch comprises a housing 12 to which is attached a base 13 carrying a plurality of fixed contacts whose outward extensions are indicated at 14, together with a contact carrier 15 (movable between a neutral and two settable positions) having a plurality of contacts 16, which are adapted to engage the fixed terminals in a predetermined manner so as to properly interconnect the turn signal circuits in the neutral and in the settable positions. A return spring 20 is mounted within a slot in the carrier 15, the ends of which engage fixed abutments 21 and 22 secured to the housing and extending down into the slot. On the carrier 15 is arranged a slider 23 which has legs extending inwardly to engage each end of both the carrier and the return spring. The carrier mounts the stud s which extends outwardly through the slot 24 in the housing 12 and through the slot 19 in the arm A. The return spring 20 tends to center the carrier, slider and stud in the neutral position as shown. The stud is adapted to be moved to either the left or right-hand settable positions by the arm A. When the arm moves the stud, for example, to the left, the right-hand legs of the slider 23 move the carrier 15 and cause the return spring 20 to be compressed against the left abutment 21. When the arm is moved back toward neutral, the spring 20 causes the slider, carrier and stud to also move back to the neutral position.

It will be noted that the slot 19 in the arm provides for a lost motion connection between the arm A and the stud s. This is desirable for the type of switch mechanism which has an internal return spring such as the return spring 20 for the mechanism shown. When a switch mechanism having no internal return spring is used, the lost motion connection is preferably eliminated and the switch positioned in neutral wholly by the action of the arm A.

As best seen in Figure 4, the operating arm A is movably or slidably mounted interjacent the plates 1 and 2. The moving or sliding action of the arm is accommodated by the upper runners 25 and 26, which bear on the front plate 1, the upper runner 30 bearing on the back plate 2, and the lower runners 31 and 32 bearing on the back plate 2, together with a block 33 (see Figure 10) fixed to the arm by screws 34 and nested within the channel 3.

In the embodiment shown, the post P is part of a dimmer switch assembly 35 secured to the arm A by screws 36. As best seen in Figure 4, the housing for the assembly extends through the slot 10 and carries the terminals 40, which are connectible in the dimmer circuit of the vehicle. When the post P is depressed, i. e., moved inwardly as shown by the arrow 41 in Figure 4, the dimmer circuits are energized. When the post is moved to either the left or right settable position, the whole dimmer assembly moves accordingly, the movement being accommodated by the length of slot 10. The post P can be depressed in the neutral or in either settable position.

The position of the arm A shown in Figures 1 through 5 is the neutral position and it is adapted to be yieldably held in this position by the return spring 42. As best seen in Figures 2 and 5, the spring 42 is carried in a slot 43 of a block 44 mounted on the back plate 2. As best seen in Figure 9, the block 44 is fitted within the channel 4, which prevents vertical movement thereof (as viewed in Figure 2) and is held against movement to the left and right by means of the tabs 45 extending into the channel from the back plate. As best seen in Figure 3, the enlarged portion 43a of the slot 43 carries the spring. The length of the portion 43a is chosen so that when the spring is inserted therein, it will be compressed. As best seen in Figure 5, the arm has two tabs 46 and 50 which extend into the slot and, in the position shown, engage opposite ends of the spring.

With reference to Figure 3, it will be apparent that if the arm A is moved, say, to the left, the tab 46 will move through the portion 43b and the tab 50 will, in moving to the left through the portion 43a, compress the spring 42 against the left-hand end of the slot 43a. When the force causing the arm to move is relieved, the spring 42 will bear against the tab 50 and return the arm to the neutral position. If the arm is moved to the right, the tab 50 moves through the portion 43c and the tab 46 compresses the spring against the right-hand end of the slot 43a. When the force on the arm is relieved, the return spring 42 will return the arm to neutral.

As mentioned heretofore, when the arm A is moved to either the left or right-hand settable position, it is held therein until the turn is completed. The means for locking the arm is explained following.

A pawl plate 51 and an operating plate 49 are sandwiched in between the arm A and the front plate 1. The pawl plate is connected to the arm to be movable therewith and the operating plate is adapted to interengage the pawl plate to lock the same in either settable position. Preferably the connection between the pawl plate and the arm is of the yieldable type, i. e., the pawl plate and the arm can move in unison or the arm can move while the plate remains fixed. This latter relative motion is used in manual cancelling as will be noted later. First, the manner in which the pawl plate is yieldably connected to the arm will be explained.

In Figures 1 and 4 it will be noted that the pawl plate has two upper tabs 52 and 53, which overlie the upper surface 54 of the arm A. These tabs assist in correctly positioning the pawl plate with respect to the arm. As seen in Figure 3, the block 33 has a slot 55 extending in the same direction as the channel 3, the enlarged portion 55a of the slot carrying a spring 56. The portions 55b and 55c of the slot are arranged in coincidence with similar slots 60 and 61 (see Figure 2) in the arm A. As will be apparent from an inspection of Figures 1, 4 and 6, the pawl plate 51 is provided with tabs 62 and 63 which extend (Figure 2) through the slot 60 and (Figure 3) into the portions 55b and 55c and bear on the ends of spring 56. The length of the spring 56 is chosen so that it is compressed when fixed in the slot. The spring holds the arm and plate in the relative positions as shown. However, it will be apparent that if the pawl plate 51 is held fixed, the arm can move, say, to the right, the movement being accommodated by the fact that the slots 60—55b and 61—55c move past the tabs 62 and 63. With such movement, the spring is held against the tab 61 and compressed by the left-hand end of the enlarged portion 55a. When the force holding the pawl plate 51 is relieved, the plate will move up to assume the position as shown. A similar effect takes place if the arm is moved to the left while the plate is fixed. The pawl plate is locked by the action of the operating plate 49 as will be explained following.

Interjacent the pawl plate 51 and the front plate 1 is an operating plate 49. A tab 65 on the pawl plate and a tab 66 on the operating plate mount a spring 70 (Figure 1) which pulls the operating plate 49 upwardly so that the tabs 71 and 72 thereof engage the bottom surface 73 of the pawl plate.

As best seen in Figure 1, the operating plate 49 has a pair of spaced-apart arcuate slots 74 and 75 which extend generally in a direction transverse the direction of elongation of the channel 3 or to the direction of movement of the arm A along the channel. These slots accommodate two pins or studs 76 and 80 formed in the front plate 1. The pins and slots are arranged to prevent movement of the operating plate either to the left or right, but provide for a shifting or tilting motion of the operating plate relative to the pawl plate.

On the top portion of the operating plate are two shoulders 81 and 82 which are used in automatic cancelling, as will be explained later, and on the bottom of the operating plate are two legs 83 and 84 carrying a pair of abutments 85 and 86 which, as will be seen in Figure 10, extend underneath the arm A. These abutments 85 and 86 are disposed near a pair of abutments 87 and 88 on the arm A. The two pairs of abutments cooperate in the manual cancelling, as will be explained later.

If the post P is moved toward the right-hand settable position, the arm A and pawl plate 51 are also caused to move to the right. Since the operating plate is fixed against sidewise movement, the bottom surface 73 of the pawl plate moves relative to the tabs 71 and 72 on the operating plate. As the inclined surface 90 of the pawl plate comes into registry with the tab 71, the left-hand end of the operating plate will pivot clockwise or move upwardly since it is urged in that direction by the spring 70. The movement of the arm and pawl plate continues to the right until the post P engages the right-hand end of the slot 6. At this time the detent 91 comes into registry with the tab 71 and the tab slides into the detent. The position of the parts in the right-hand settable position is clearly shown in Figure 6. In this position it will be noted that the arm return spring 42 has been compressed and that the operating stud s of the switch mechanism S has been moved to the right. If the operator's foot is removed from the post, the return spring 42 will attempt to move the arm to the left back toward neutral position, but this motion will be prevented by the detent 91 on the pawl plate bearing against the tab 71.

With the device in the position shown in Figure 6 (the right-hand settable position) the switch mechanism S will cause energizing of the turn signal equipment so as to indicate a right-hand turn. The parts will remain in this position until automatically or manually cancelled, i. e., so that the operating plate unlocks the arm and pawl plate and permits the same to move back to neutral. Automatic cancellation is explained following.

As seen in Figure 1, the operating plate carries a pair of pivots 92 and 93 which respectively rotatably mount cancelling pawls 94 and 95. Each pawl is provided with arcuate abutments 100 and 101. Interconnected between the pawls and the pawl plate are the tension springs 102 and 103 which maintain the pawls in the position shown.

As seen in Figure 1, the dotted line l represents the locus of movement of one or more cancelling tabs T which are connected to and rotatable with the steering post of the vehicle. The device is mounted on the floorboard of a vehicle so that with the arm A in the neutral position, the pawls are symmetrical with respect to the locus line l. In this position it will be apparent that as the cancelling tab T is moved, it will not contact the pawls. However, with the parts in the right-hand settable position (Figure 6), the pawl 95 moves into the path of movement of the tab T. As the turn is being made, the tab T is moving in the clockwise direction, and when it contacts the pawl 95, the tab will be rotated in the counter-clockwise direction as seen in Figure 13. It will be noted that with such movement, no part of the pawl contacts the operating plate. However, after a turn is completed and the wheel is being straightened out, the tab T will be moved in the counter-clockwise direction and will engage the pawl as shown in Figure 6. Further movement of the tab causes the pawl to rotate in the clockwise direction. As the pawl 95 rotates in the clockwise direction, the abutment 101 engages the shoulder 81 on the operating plate and moves the operating plate downwardly so that the tab 71 moves out of the detent 91 as is shown in Figure 7. The return spring 42 then takes over and causes the arm and pawl plate to move to the left, and the inclined surface 90 causes further downward movement of the tab 71 and the pawl plate and arm continue to move until the parts assume the position shown in Figure 1. It will be apparent that when the cancelling tab T moves out of the area of engagement with the pawl 95, the spring 103 will pull the pawl back to the position as shown in Figure 1.

When the arm moves back towards neutral position, the return spring 29 causes the switch mechanism S to assume neutral position and the right-hand turn signals are cancelled.

While the explanation of locking and cancelling has been in connection with the parts as shown in the right-hand settable position, it will be understood that similar locking and cancelling takes place when the device is set so that the parts are in the left-hand settable position. For example, when the post P is moved to the left to engage the left-hand side of the slot 6, the arm A, the pawl plate 51 and the switch stud s also move to the left. The operating plate 49 pivots counterclockwise and the tab 72 is disposed in the detent 91' so as to lock the parts in the left-hand position. The pawl 94 cooperates with the tab T in a manner similar to that explained above. When the tab T rotates counter-clockwise during a left-hand turn, it may contact the pawl 94, which merely rotates on its pivot. However, when the tab T rotates clockwise after the turn is completed, it contacts the pawl to rotate the same so that the abutment 100 engages the abutment 82 on the operating plate, which moves downwardly and causes the tab 72 to move out of the detent 91' and so release the pawl plate and arm.

The manner in which the switch is manually cancelled will be explained following.

Assume that the operator has moved the post P to indicate a right turn so that the parts are in the position shown in Figure 6. If the operator decides not to make the turn and desires to cancel the turn indication, he merely taps the post to move the same to the left. Movement of the post to the left also causes movement of the arm to the left, the pawl plate being temporarily held by the tab 71, and the relative motion between the arm and pawl plate being accommodated by the spring 56. As the arm moves to the left, it will be apparent that the abutment 87 will contact the abutment 85 on the operating plate and cause the operating plate to be moved downwardly as is seen in Figure 8. Downward movement, of course, moves the tab 71 out of the detent 91 so that the pawl plate and arm are free to move to the neutral position by action of springs 56 and 42.

When the device is in the left-hand settable position, it may be manually cancelled by the operator moving the post P to the right. In this instance, the abutment 88 on the arm contacts the abutment 86 on the operating plate and moves the plate downwardly so that the tab 72 moves out of the detent 91' and so frees the arm and pawl plate so that the same are moved back to the neutral position.

Another embodiment of the invention is shown in Figures 11 and 12. This is substantially identical in structure to the first embodiment already described except that the dimmer switch assembly is eliminated and certain parts are somewhat larger. Except for the dimmer switch aspect, the present embodiment functions and operates the same as the first. The difference in structure is noted following.

The device comprises a front plate 1', a back plate 2', an arm A', a pawl plate 51', an operating plate 49' and a switch mechanism S'. It will be observed that the post P' secured to the arm A' does not have the dimmer assembly.

The arm return spring arrangement is similar to that already described except that the parts are somewhat larger, comprising a block 44' mounted on the back plate 2' by the tabs 45' and having a slot 43' carrying the return spring 42'. The arm A' carries tabs 46' and 50' for compressing the spring.

The slidable interconnection between the arm A' and the pawl plate 51' is the same as previously described except that the parts are somewhat larger, comprising the block 33' having a slot 55' carrying the spring 56'. The tabs 62' and 63' on the pawl plate are disposed in the slot engaging the spring 56'. It will be noted that the tabs 62' and 63' on pawl plate 51' are spaced somewhat farther apart than the corresponding tabs 62 and 63 and pawl plate 51.

I claim:

1. A device to be mounted on the floorboard of an automotive vehicle for use in the turn signal equipment thereof comprising: a mounting bracket; an elongated operating arm movably mounted on said bracket and positionable in a neutral and either of two settable positions; turn signal switch mechanism mounted on said bracket and connected with and actuable by movement of said arm; spring means to urge the operating arm to the neutral position; an operating post disposed at one end of said arm and being actuable by the foot of the operator for moving the arm as between said neutral and either of said settable positions; and mechanism for association with the steering post of the vehicle interposed between said bracket and said arm adjacent the other end of the arm and having means to lock the arm when moved to either settable position and further having means to release the arm from either settable position, the release means being adapted to be actuable by movement of the vehicle steering post.

2. A device to be mounted on the floorboard of an automotive vehicle for use in the turn signal equipment thereof comprising: a mounting bracket; an elongated operating arm movably mounted on said bracket and positionable in a neutral and either of two settable positions; turn signal switch mechanism mounted on said bracket and connected with and actuable by movement of said arm; spring means to urge the operating arm to the neutral position; an operating post disposed at one end of said arm and being actuable by the foot of the operator for moving the arm as between said neutral and either of said settable positions; and mechanism for association with the steering post of the vehicle interposed between said bracket and said arm adjacent the other end of the arm and having means to lock the arm when moved to either settable position and further having means to release the arm from either settable position, the release means having mechanism adapting the same for actuation alternatively by movement of the vehicle steering post or by movement of the arm toward said neutral position.

3. A device to be mounted on the floorboard of an automotive vehicle for use in turn signal and dimmer equipment thereof comprising: a mounting bracket; an elongated operating arm movably mounted on said bracket and positionable in a neutral and either of two settable positions; an assembly disposed at one end of said arm including a dimmer switch having an operating post actuable by the foot of the vehicle operator for energizing the dimmer circuit and for moving said arm as between said neutral and either of said settable positions; an operating post disposed at one end of said arm and being actuable by the foot of the operator for moving the arm as between said neutral and either of said settable positions; and mechanism for association with the steering post of the vehicle interposed between said bracket and said arm adjacent the other end of the arm and having means to lock the arm when moved to either settable position and further having means to release the arm from either settable position, the release means being adapted to be actuable by movement of the vehicle steering post.

4. A device to be mounted on the floorboard of an automotive vehicle for use in turn signal and dimmer equipment thereof comprising: a mounting bracket; an elongated operating arm movably mounted on said bracket and positionable in a neutral and either of two settable positions; spring means to urge the operating arm to the neutral position; an assembly disposed at one end of said arm including a dimmer switch having an operating post actuable by the foot of the vehicle operator for energizing the dimmer circuit and for moving said arm as between said neutral and either of said settable positions; an operating post disposed at one end of said arm and being actuable by the foot of the operator for moving the arm as between said neutral and either of said settable positions; and mechanism for association with the steering post of the vehicle interposed between said bracket and said arm adjacent the other end of the arm and having means to lock the arm when moved to either settable position and further having means to release the arm from either settable position, the release means having mechanism adapting the same for actuation alternatively by the movement of the vehicle steering post or by movement of the arm toward said neutral position.

5. A device to be mounted on the floorboard of an automotive vehicle for use in turn signal and dimmer equipment thereof comprising: a mounting bracket; an elongated operating arm movably mounted on said bracket and positionable in a neutral and either of two settable positions; switch mechanism interconnected with said bracket and said arm and actuable by movement of said arm, the switch being for operating the turn signal equipment of the vehicle; spring means to urge the operating arm to the neutral position; a dimmer switch assembly disposed at one end of said arm and having an operating post to be actuated by the foot of the vehicle operator for operating the dimmer equipment of the vehicle and for moving said arm as between said neutral and either of said settable positions; and mechanism for association with the steering post of the vehicle interposed between said bracket and said arm adjacent the other end of the arm and having means to lock the arm when moved to either settable position and further having means to release the arm from either settable position, the release means having mechanism adapting the same for actuation alternatively by the movement of the vehicle steering post or by movement of the arm toward said neutral position.

6. A device to be mounted on the floorboard of an automotive vehicle for use in the turn signal equipment thereof comprising: a mounting bracket; an elongated operating arm movably mounted on said bracket and positionable in a neutral and either of two settable positions; spring means to urge the operating arm to the neutral position; a turn signal initiating switch including an operating stud having a lost motion connection with said arm whereby the stud is positionable in positions corresponding to said positionable neutral and said settable positions and spring means to urge said stud to said neutral position; an operating post connected with said arm and actuable by the foot of the vehicle operator for moving said arm from said neutral position to either of said settable positions; means to lock said arm when moved an amount sufficient to position said stud in either of said settable positions; and cancelling mechanism for association with the steering post of a vehicle including means actuable by the rotation of the steering post to release said arm from either of its locked positions.

7. A device to be mounted on the floorboard of an automotive vehicle for use in the turn signal equipment thereof comprising: a switch mechanism to condition the vehicle turn signal circuits for operation; an arm movable between a neutral position and either of two settable positions and interconnected with said switch for actuating the same, the arm having a pair of spaced-apart abutments; spring means to urge the arm to said neutral position; locking means to lock said arm when moved to either settable position; cancelling means mounted on said arm and movable therewith, the cancelling means, when actuated, being engageable with said locking means to cause the same to unlock the arm, the cancelling means being arranged to be actuable by movement of the steering post of the vehicle; and spring means operatively interconnected as between said cancelling means and said arm and providing, when said arm is in either settable position, for the arm to be movable toward the neutral position whereby one of said abutments engages the locking means and moves the same out of locking position.

8. A device to be mounted on the floorboard of an automotive vehicle for use in the turn signal equipment thereof comprising: a switch mechanism to condition the vehicle turn signal circuits for operation; an arm movable in translation between a neutral position and either of two settable positions and interconnected with said switch for actuating the same; return spring means to force the arm from either settable position to said neutral position and yieldably hold the same therein; shiftable locking means including spring mechanism to lock said arm against the force of said return spring when the arm is moved to either setttable position; and cancelling means mounted on said arm and movable therewith, the cancelling means, when actuated, being engageable with said locking means to cause the same to shift to unlock the arm to allow the return spring means to move the arm to neutral, the cancelling means being arranged to be actuable by movement of the steering post of the vehicle.

9. A device to be mounted on the floorboard of an automotive vehicle for use in the turn signal equipment thereof comprising: a switch mechanism to condition the vehicle turn signal circuits for operation; an arm movable between a neutral position and either of two settable positions and interconnected with said switch for actuating the same, the arm having a pair of spaced-apart abutments; a dimmer switch assembly disposed at one end of said arm and having an operating post actuable by the foot of the vehicle operator for energizing the dimmer circuit and for moving said arm as between said neutral and either of said settable positions; spring means to urge the arm to said neutral position; locking means to lock said arm when moved to either settable position; cancelling means mounted on said arm and movable therewith, the cancelling means, when actuated, being engageable with said locking means to cause the same to unlock the arm, the cancelling means being arranged to be actuable by movement of the steering post of the vehicle; and spring means operatively interconnected as between said cancelling means and said arm and providing, when said arm is in either settable position, for the arm to be movable toward the neutral position whereby one of said abutments engages the locking means and moves the same out of locking position.

10. A device to be mounted on the floorboard of an automotive vehicle for use in the turn signal equipment thereof comprising: a mounting bracket for mounting the device on a vehicle floorboard; an elongated operating arm movably mounted in said housing and movable in translation as between a neutral and either of two settable positions on opposite sides of neutral; turn signal switch mechanism mounted on said housing and connected with and actuated by movement of said arm; an operating post disposed at one end of said arm and being actuable by the foot of the vehicle operator for moving the arm as between said neutral and either of said settable positions; a pair of rotatable cancelling pawls for association with the steering post of the vehicle so as to be engaged and rotated by a cancelling tab on the steering post; a pawl plate rotatably supporting said pawls and mounted in yieldable engagement with said arm, the yielding engagement providing for the arm and plate to normally move together but providing for relative motion as between the arm and plate, the direction of yielding being in the same direction as the movement of the arm as between the neutral and the settable positions; an operating plate pivotally interconnected with said housing; spring means engaging said operating plate and operating to urge the operating plate, when the operating arm is in either settable position, into engagement with said pawl plate to lock the pawl plate and arm in position, and the operating plate, while in said locking position, being in close association with one of said pawls so as to be engaged by the pawl and moved out of locking position when the pawl is rotated; and abutment means on said operating plate engageable with said arm when the same is moved, the arm being movable toward neutral position when said pawl plate is locked in either of said settable positions by virtue of said yielding engagement, the movement of the arm engaging said abutment means and moving the operating plate to unlock the pawl plate.

11. A device to be mounted on the floorboard of an automotive vehicle for use in the turn signal equipment thereof comprising: an elongated front plate; an elongated back plate having a channel running throughout the length thereof, the back plate being secured to but spaced from said front plate; a first block mounted in said channel, the block having an elongated slot running in the same direction as said channel; a spring fixed in said slot; an elongated operating arm interposed between said front and back plates slidably engaging said first block and having a pair of abutments each extending into said slot and respectively engaging opposite ends of said spring; a second block mounted on said arm and slidably mounted in said channel and having an elongated slot running in the same direction as said channel; a spring fixed in said slot; slot means in said arm and in coincidence with said second slot; a pawl plate slidably mounted on said arm and having a pair of abutments extending through said slot means and into said second slot respectively on opposite sides of said second spring; a pair of spring-loaded cancelling pawls rotatably mounted on said pawl plate; an operating plate disposed between said pawl plate and said front plate; a pair of spaced-apart arcuate slots in said operating plate, the slots extending in a direction generally transverse to said channel; a pair of pivots in said front plate and extending into the slots in said operating plate; a spring connected between said pawl plate and said operating plate and urging said operating plate into engagement with said pawl plate; an operating post connected to said arm and being actuable by the foot of the operator for moving the arm; and a turn signal switch mounted on said back plate and having an operating stud engaging said arm and adapted to be moved thereby.

12. A device to be mounted on the floorboard of an automotive vehicle for use in the turn signal equipment thereof comprising: an elongated front plate; an elongated back plate having a channel running throughout the length thereof, the back plate being secured to but spaced from said front plate; a first block mounted in said channel, the block having an elongated slot running in the same direction as said channel; a spring fixed in said slot; an elongated operating arm interposed between said front and back plates slidably engaging said first block and having a pair of abutments each extending into said slot and respectively engaging opposite ends of said spring; a second block mounted on said arm and slidably mounted on said channel and having an elongated slot running in the same direction as said channel; a spring fixed in said slot; slot means in said arm and in coincidence with said second slot; a pawl plate slidably mounted on said arm and having a pair of abutments extending through said slot means and into said second slot respectively on opposite sides of said second spring; a pair of spring-loaded cancelling pawls rotatably mounted on said pawl plate; an operating plate disposed between said pawl plate and said front plate; a pair of spaced-apart arcuate slots in said operating plate, the slots extending in a direction generally transverse to said channel; a pair of pivots in said front plate and extending into the slots in said operating plate; a spring connected between said pawl plate and said operating plate and urging said operating plate into engagement with said pawl plate; a dimmer switch assembly disposed at one end of said arm and having an operating post actuable by the foot of the vehicle operator for energizing the dimmer circuit and for moving said arm; and a turn signal switch mounted on said back plate and having an operating stud connected with said arm and adapted to be moved thereby.

13. A construction in accordance with claim 12 wherein said turn signal switch includes a spring to urge said stud to a position corresponding to said neutral position and wherein there is a lost motion connection between the stud and said arm.

14. A device to be mounted on the floorboard of an automotive vehicle for use in the turn signal equipment thereof comprising: a switch mechanism to condition the vehicle turn signal circuits for operation; an arm movable between a neutral position and either of two settable positions and interconnected with said switch for actuating the same; spring means to urge the arm to said neutral position; a plate yieldably connected with said arm, the yielding connection providing for the plate and arm to move together and for the plate to remain fixed while the arm moves; locking means to engage said plate and hold the plate and arm when moved to either settable position; a pair of cancelling pawls interconnected with said arm and movable therewith, the pawls, when actuated, being engageable with said locking means to cause the same to unlock the arm, the pawls being arranged to be actuated by movement of the steering post of the vehicle; and a pair of spaced-apart abutments on said arm engageable with said locking means when said plate remains stationary and the arm is moved from a settable position toward neutral.

References Cited in the file of this patent

UNITED STATES PATENTS

| | | |
|---|---|---|
| 2,678,358 | Thomson | May 11, 1954 |
| 2,690,483 | Elliott et al. | Sept. 28, 1954 |
| 2,722,577 | Barcus | Nov. 1, 1955 |
| 2,728,825 | Lincoln et al. | Dec. 27, 1955 |
| 2,739,197 | Lingenbrink | Mar. 20, 1956 |